Patented July 15, 1952

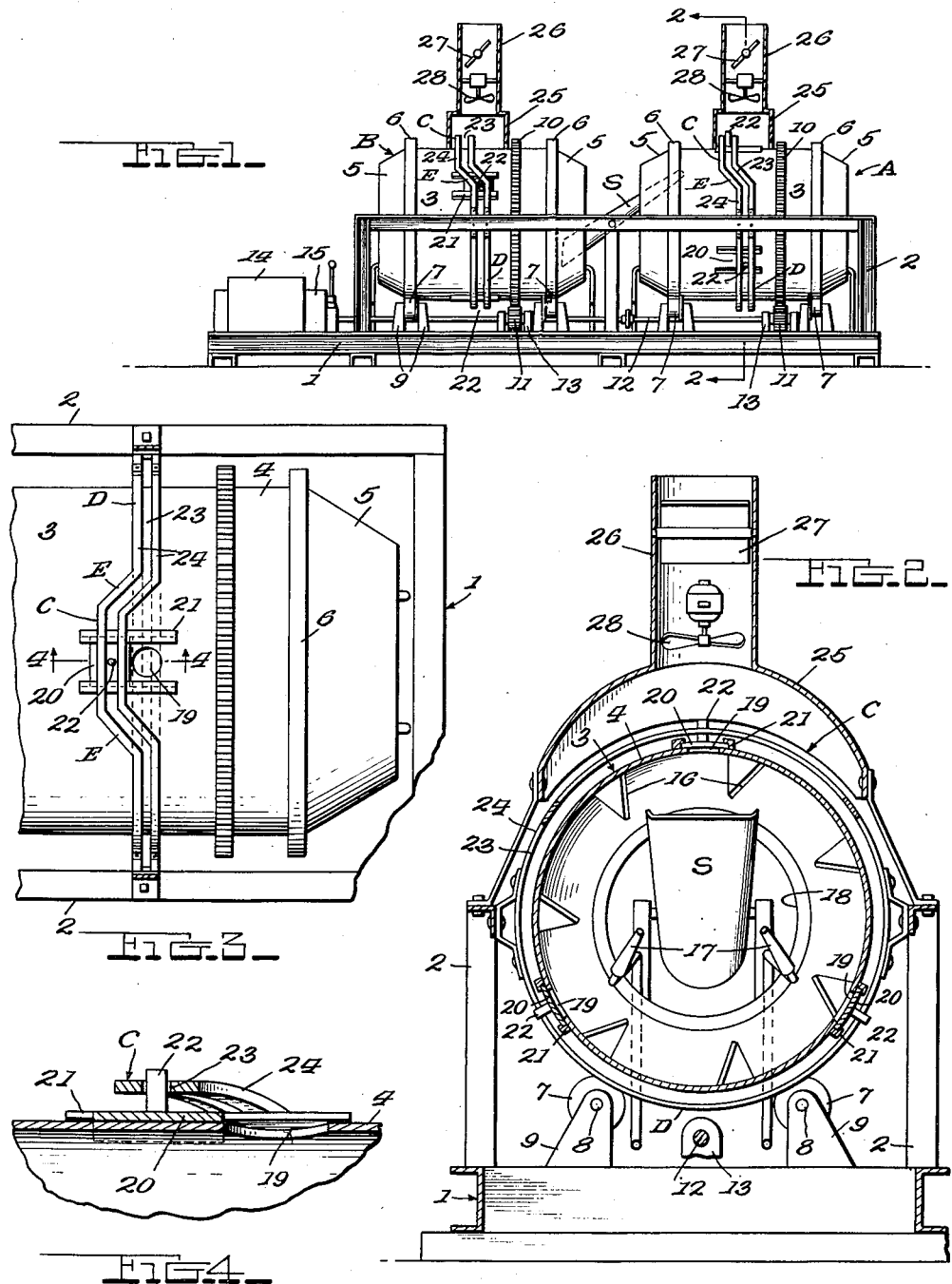

2,603,005

UNITED STATES PATENT OFFICE 2,603,005

APPARATUS FOR VENTING THE INTERIOR OF ROTARY DRIERS AND MIXERS

Perry T. Ford, Columbus, Ohio

Application June 10, 1950, Serial No. 167,453

2 Claims. (Cl. 34—141)

This invention relates to drying or mixing apparatus, and more particularly to apparatus of this character wherein is employed a rotatably mounted material-receiving drum supported for rotation about a principal axis passing longitudinally through the same, and wherein improved means are provided for removing vapors, volatiles and finely divided solids from the interior of the drum.

In my prior patent, No. 2,492,792, dated December 27, 1949, I have set forth apparatus for heating and drying mineral aggregates, such as gravel, granite chips and the like to remove moisture therefrom preparatory to admixture of said aggregate with bituminous materials to form highway or roadway-surfacing mixes.

For an understanding of a single practical use to which the present invention is applicable, it may be stated that in the preparation of bituminous mixes of the type used in road paving, a relatively large quantity of mineral aggregates, including crushed stone, gravel, granite chips and the like are admixed with a quantity of bituminous material, such as asphalt, which is usually maintained in a fluid or semifluid state at relatively elevated temperatures prior to pouring or road-surfacing operations. To insure proper binding and adhesion between the bituminous material and the mineral aggregate, it is important that the aggregate be admixed with the bituminous material when in a dry state, as any moisture contained in or upon the surfaces of the relatively finely divided aggregate will tend to prevent proper adherence between the two essential constituents of the mix. Further, it has been found advantageous to introduce the aggregate into the bituminous material at elevated temperatures corresponding substantially with the temperatures of the bituminous material so that the resultant temperature of the mix will remain substantially constant.

Apparatus for preheating the mineral aggregate of such a mix has been set forth in my aforesaid patent, the latter disclosing a rotatably mounted drum adapted for the reception of a mineral aggregate, the drum being provided internally with burner means for developing heat and with internal wall-mounted bucket or vane devices by which the solid particles of material comprising a mineral aggregate are agitated and lifted to insure complete mixing and also maximum surface area exposure so that moisture may be liberated and driven from the surfaces of the aggregate particles, whereby the latter will be in a mixed, heated and relatively dry state prior to admixture with a hot bituminous compound with which the mineral particles are adapted to be coated.

While the drum or drums of my aforesaid machine is open at both ends to admit mineral aggregate into and discharge the same from the drum, nevertheless, the upper portions of the symmetrical cylindrical drum serve to confine water vapor and possibly other volatiles within the confines of the drum, preventing the free escape and discharge of such vapors or volatiles to facilitate the drying operation.

Accordingly, it is an object of the present invention to provide a rotary drier or mixer which is provided with means for automatically releasing vapors, volatiles and lightweight finely divided solids, such as dust, from the interior of the drier, whereby to provide a means for improving the drying action of such rotatable driers or mixers and shorten the drying period of retention of materials within the drum.

Another object of the invention is to provide a rotary mixer or drier composed of the material-receiving drum which is supported for rotation about a principal axis extending longitudinally therethrough, and wherein the drum includes an outer wall formed with a vapor vent arranged intermediately of the length of the drum.

A still further object is to provide a vented drum of this character with a movable valve member, and with operating means coacting with said valve member for maintaining the same in a position of vent closure when the drum rotates through positions in which solid materials placed therein would be enabled to pass gravitationally through said vent in the absence of the valve member, and wherein said valve-actuating mechanism is also such as to move said valve member to a position opening said vent and providing for the release of vapors and volatiles from the interior upper portions thereof when said drum is moved through a sector of rotation in which the vented portions thereof are disposed above the materials undergoing drying and positioned within the drum.

For a further understanding of the invention, reference is to be had to the following description and the accompanying drawings, wherein:

Fig. 1 is a view partly in side elevation and vertical section and disclosing rotary drier apparatus having valve-governed vapor vents formed and operated in accordance with the present invention;

Fig. 2 is a vertical transverse sectional view taken through the apparatus on the plane indicated by the line 2—2 of Fig. 1;

Fig. 3 is a fragmentary view partly in horizontal section and in top plan and disclosing the drum carried valve mechanism and the frame-carried position-controlling track for the valve mechanism;

Fig. 4 is a detail vertical sectional view on the plane indicated by the line 4—4 of Fig. 3.

Referring to the drawings, there has been illustrated in Fig. 1 a mineral-preheating apparatus of the type disclosed in the drawings of my aforesaid patent and in which the valved vents of the present invention are incorporated. In Fig. 1 of the drawings of this application, drying apparatus has been set forth involving dual drying drums arranged in tandem relationship, although it will be understood as the description proceeds that my novel-controlled vents may be embodied in apparatus involving but a single drying drum, or in rotary driers or mixers intended for uses other than in the formation of materials suitable for highway or roadway applications. In my aforesaid prior patent, both single and dual drums have been disclosed.

As shown, the apparatus embodies a bed 1 including a rigid upright frame 2. The bed may either be stationarily mounted for use in a single site or may be placed on the bed of a road vehicle for transportation from one working position to another. Mounted on the bed are one or more mixing and drying drums 3. Each of these drums includes an outer cylindrical shell 4 having frusto-conical ends 5. The drums are equipped with external annular guide rings 6 which are receivable in spaced pairs of flanged supporting rolls 7, the latter being mounted for rotation, as at 8, on brackets 9 arising from the bed 1. Also, each of the drums is equipped with an external gear ring 10, the teeth of which mesh with those of a cog gear 11 mounted on a longitudinally extending shaft 12, the latter being supported for rotation in bearings 13, carried by the bed 1 and a motor or other prime mover 14 having a change speed transmission 15 utilized to drive the shaft 12 and the drum or drums associated therewith.

Interiorly, the drums are provided with the usual buckets or vanes 16 which, upon rotation of the drums, advance the loose mineral materials positioned therein, elevating such materials and causing the same to drop back toward the bottoms of the drums, so that said materials will be exposed to the heat of gases developed, for example, by the operation of burners indicated at 17. The ends of the drums are open, as indicated at 18, so that the mineral aggregate may be introduced into the drums and removed therefrom after drying. In the dual drum arrangement disclosed in Fig. 1, the heated minerals are transferred from the initial heating drum A to the final heating drum B by means of a tiltable transfer chute S.

In the operation of apparatus of this kind, the vapors released from the aggregate during drying thereof in the drums A and B, collects or pockets in the upper regions of the drums and interferes with or retards the drying operation. In order to remove such vapors in a positive and effective manner from the interior of the drum or drums, as rapidly as such vapors are formed, each of the drums has its outer shell 4 provided with a plurality of vents in the form of the openings indicated at 19. These vents are adapted to be opened or closed by means of sliding valve members 20, which in this instance are mounted for reciprocation in guides 21 arranged exteriorly on the drum shells 4 adjacent the vents. To move the valve members at the proper time, each of the same is provided with an upstanding cam follower stud or roller 22 which is adapted for movement in a continuous guide 23 formed in a cam track 24, the latter being stationarily carried by the frame 2 and has its upper portion, indicated at C, laterally offset with respect to its lower portion D, with portions C and D being united by the angular regions, indicated at E.

With this construction, it will be seen that as the drum or drums revolve, the studs or rollers 22 of the valve members, moving in the continuous guides 23, will cause shifting of the valve members to open and close the vents 19. The vents are closed when the same are disposed in the lower sector of rotation of each drum, that is, in regions of drum operation in which materials will flow gravitationally through the vents if the valve members thereof did not occupy positions of closure. In the upper regions of rotation of the drums, the angularly offset upper region C of the cam track produces opening of the valve members, since such opening can be safely accomplished as the contents of the drum will then be disposed beneath the vents.

If desired, the frame 2 may be provided with hoods 25 extending over the upper central region of the drums in vertical relation to the vents, each hood having one or more outlet stacks 26 leading to the atmosphere, each of these stacks being equipped with an adjustable damper or other flow regulator 27. An electric motor-driven blower or fan 28 may be mounted in each of the stacks to create a draft therethrough, the draft being such as to produce in a positive manner outflow of water vapor or other volatiles from the interior of the drum or drums 3.

In view of the foregoing, it will be apparent that the present invention provides an improved means for positively and automatically venting the interiors of any rotary drum employed in mixing and drying apparatus, particularly mixers and driers utilized in the forming and drying of road-paving materials. The operation of the apparatus is virtually automatic, the same requiring little or no manual attention.

Another important feature residing in the provision of the present improved venting valves in connection with rotary drying drums of the type particularly employed in heat treating and drying mineral aggregates, rests in the ability of the drums and vent means to separate and make possible the collection of dust and other lightweight finely divided solids normally occurring in mineral aggregates. By employing the ventilating stacks 26, in conjunction with a natural draft or forced air system within the hoods 25, dust particles within the mineral aggregate undergoing treatment in the final drying stages may be driven off through the venting means during rotation of the drums and ultimately collected by means of suitable filters and containers, not shown, which may be conveniently attached to the exhaust outlets, such as the stacks 26. The possibility of collecting and separating dust particles during the drying operation greatly improves the overall function of the drying apparatus in preventing nuisances normally associated with the treatment and agitation of mineral aggregates.

While a single preferred embodiment of the present invention has been disclosed in detail, it will be understood that various modifications

I claim:

1. In a drying apparatus having a rotary drum arranged for axial rotation about a substantially horizontal axis, said drum being formed with a plurality of circumferentially spaced vent openings; a valve mounted on said drum adjacent each of said vent openings; a cam follower member carried on said valve, said valve and cam follower member being movable relative to said drum to open or close the vent openings thereof; and a cam track encircling said drum in the plane of the vent openings thereof, said cam follower member being engageable with said cam track during rotation of said drum, said cam track being arranged to normally maintain said cam follower member in a valve closing position, and being formed with a laterally offset region arranged to move said cam follower member to a position opening said valve as the vent openings move during rotation of said drum through a sector in which the vent opening is above materials contained in said drum.

2. In a drying apparatus having a rotary drum arranged for axial rotation about a substantially horizontal axis, said drum being formed with a plurality of circumferentially spaced vent openings; a valve mounted on said drum adjacent each of said vent openings; a cam follower member carried on said valve, said valve and cam follower member being movable relative to said drum to open or close the vent openings thereof; a cam track encircling said drum in the plane of the vent openings thereof, said cam follower member being engageable with said cam track during rotation of said drum, said cam track being arranged to normally maintain said cam follower member in a valve closing position, and being formed with a laterally offset region arranged to move said cam follower member to a position opening said valve as the vent openings move during rotation of said drum through a sector in which the vent opening is above materials contained in said drum; a hood positioned above said drum for registration with said vent openings to collect vapors discharged upon opening of said valve; and air displacement means communicating with said hood and arranged to forcibly withdraw vapors from within said drum upon opening of said vent openings.

PERRY T. FORD.

REFERENCES CITED

The following references are of record in the file of this patent:

UNITED STATES PATENTS

| Number | Name | Date |
|---|---|---|
| 778,063 | Murphy | Dec. 20, 1904 |
| 1,850,138 | Riall | Mar. 22, 1932 |
| 1,948,279 | Schildman | Feb. 20, 1934 |
| 2,492,792 | Ford | Dec. 27, 1949 |
| 2,513,462 | Eklund | July 4, 1950 |